United States Patent [19]

Van De Moortele

[11] Patent Number: 5,186,432
[45] Date of Patent: Feb. 16, 1993

[54] SAFETY VALVE

[75] Inventor: Guido Van De Moortele, Oosterveldlaan 71, 2610 Wilrijk, Belgium

[73] Assignees: S.McD. Murphy & Partners Ltd., Dublin, Ireland; Guido Van De Moortele, Wilrijk, Belgium

[21] Appl. No.: 768,258

[22] PCT Filed: Apr. 23, 1990

[86] PCT No.: PCT/BE90/00018
§ 371 Date: Oct. 28, 1991
§ 102(e) Date: Oct. 28, 1991

[87] PCT Pub. No.: WO90/13765
PCT Pub. Date: Nov. 15, 1990

[30] Foreign Application Priority Data
Apr. 28, 1989 [BE] Belgium ............... 08900471

[51] Int. Cl.⁵ ............................. F16K 31/36
[52] U.S. Cl. ...................... 251/16; 137/498
[58] Field of Search ............ 251/15, 16; 137/498

[56] References Cited

U.S. PATENT DOCUMENTS

| 1,812,586 | 6/1931 | Elder . | |
|---|---|---|---|
| 2,025,076 | 12/1935 | Spangler | 251/16 X |
| 4,916,762 | 4/1990 | Shaw | 251/15 X |

FOREIGN PATENT DOCUMENTS

| 361645 | 10/1922 | Fed. Rep. of Germany . | |
|---|---|---|---|
| 2193164 | 2/1974 | France . | |
| 2213439 | 8/1974 | France . | |
| 28665 | 9/1967 | Israel . | |
| 32214 | 5/1969 | Israel . | |
| 75895 | 7/1985 | Israel . | |
| 360534 | 11/1931 | United Kingdom | 251/15 |
| 615776 | 1/1949 | United Kingdom . | |
| 1271213 | 4/1972 | United Kingdom . | |
| 2055454 | 3/1981 | United Kingdom . | |

Primary Examiner—Robert G. Nilson
Attorney, Agent, or Firm—Foley & Lardner

[57] ABSTRACT

Safety valve, characterized in that it principally consists of a housing (1), provided with an inlet (2) and and outlet (3); a main cut off valve (4) installed in the housing (1); and means working together with the flow of liquid which with the removal of liquid and after a lapse of time shut the main cut off valve (4), which are reset in their starting position each time an equal or almost equal pressure in the liquid is created at the inlet (2) and outlet (3) of the safety valve and which when the main cut off valve (4) is shut, hold it shut as long as a well defined drop of pressure remains in existence over the main cut off valve (4), whereby these means are driven by means of a by-pass, such by means of a channel (6) that is situated apart from the main passage (5).

29 Claims, 5 Drawing Sheets

SAFETY VALVE

This invention relates to a safety valve, more especially to a valve that is intended to be placed in pipes for liquids.

In particular the object of the invention is a safety valve for controlling the consumption of liquid in a network of pipes, whereby the safety valve provides the closing of the network of pipes when an uncontrolled removal of liquid takes place. More especially the invention concerns a valve that is closed as soon as an uninterrupted flow of liquid has existed for a well defined time.

The safety valve is in the first place intended to be placed in the supply of the domestic water mains in order by so doing in the case of leaking taps, leaking pipes or similar to obtain that after a lapse of time the water mains are automatically shut off, such in order to limit water damage and similar to a minimum.

A safety valve to control the water supply in washing machines is known from the French patent application No 2.193.164 which discloses a safety valve in which the driving mechanism for automatically closing the valve is actuated by means of the complete flow through the valve. In this way the displacement carried out by said driving mechanism is proportional to the total amount of liquid which passes through the valve.

Consequently the device as disclosed in FR 2.193.164 shows the disadvantage that the valve is shut in function of the amount of liquid passed through the valve, but not after the lapse of a predetermined period of time.

The present invention relates to a safety valve not having said disadvantage.

The present invention therefore has a safety valve as object, comprising a housing provided with an inlet and an outlet; and a main cut off valve installed in the housing; and is characterized in that it also comprises, at one hand, means working together with the flow of liquid which with the removal of liquid and after a lapse of time shut the main cut off valve, which are reset in their starting position each time an equal or almost equal pressure in the liquid is created at the inlet and outlet of the safety valve, such as a result of the interruption of the water consumption, and which when the main cut off valve is shut, hold it shut as long as a well defined drop of pressure remains in existence over the main cut off valve, whereby these means are driven by means of by-pass, such by means of a channel that is situated apart from the main passage and, at the other hand, a second cut off valve place in the main passage which allows that an almost constant and sufficient drop of pressure is created over the separate channel, even with a very small removal flow.

Preferably the by-pass consists in a channel which provides in a parallel connection over the second cut off valve.

In a preferred embodiment the aforementioned means principally consists of a moving mechanism that after a defined stroke provides for the shutting of the main cut off valve; driving means driven by means of the aforementioned by-pass in order to move the moving mechanism; coupling means consisting of at least a first coupling part and a second coupling part, which provide a coupling that can be engaged and disengaged between the driving means and the moving mechanism; servo-means which engage the coupling means during the periods that a flow of liquid is created at the inlet; resetting means which work together with the movement means and reset the latter in a starting position, each time when the removal of liquid is stopped when the main cut off valve is still opened; and the resetting means working together with the main cut off valve which can bring the cut off valve from shut to open position when the drop of pressure over the main cut off valve becomes zero or almost zero.

In order to show better the characteristics according to the present invention, a preferred embodiment is described hereafter, as example without any restrictive character, with reference to the enclosed drawings, in which.

Figure 1:
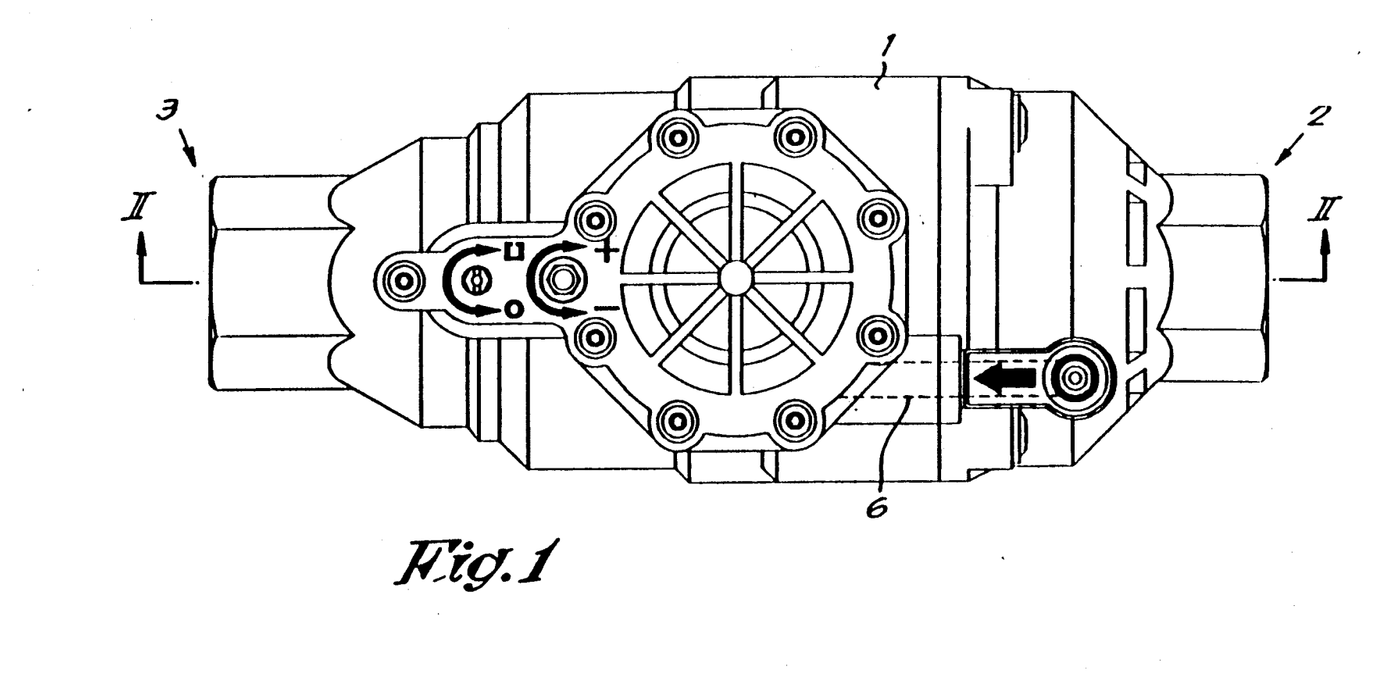
FIG. 1 shows the safety valve in top view.
Figure 2:
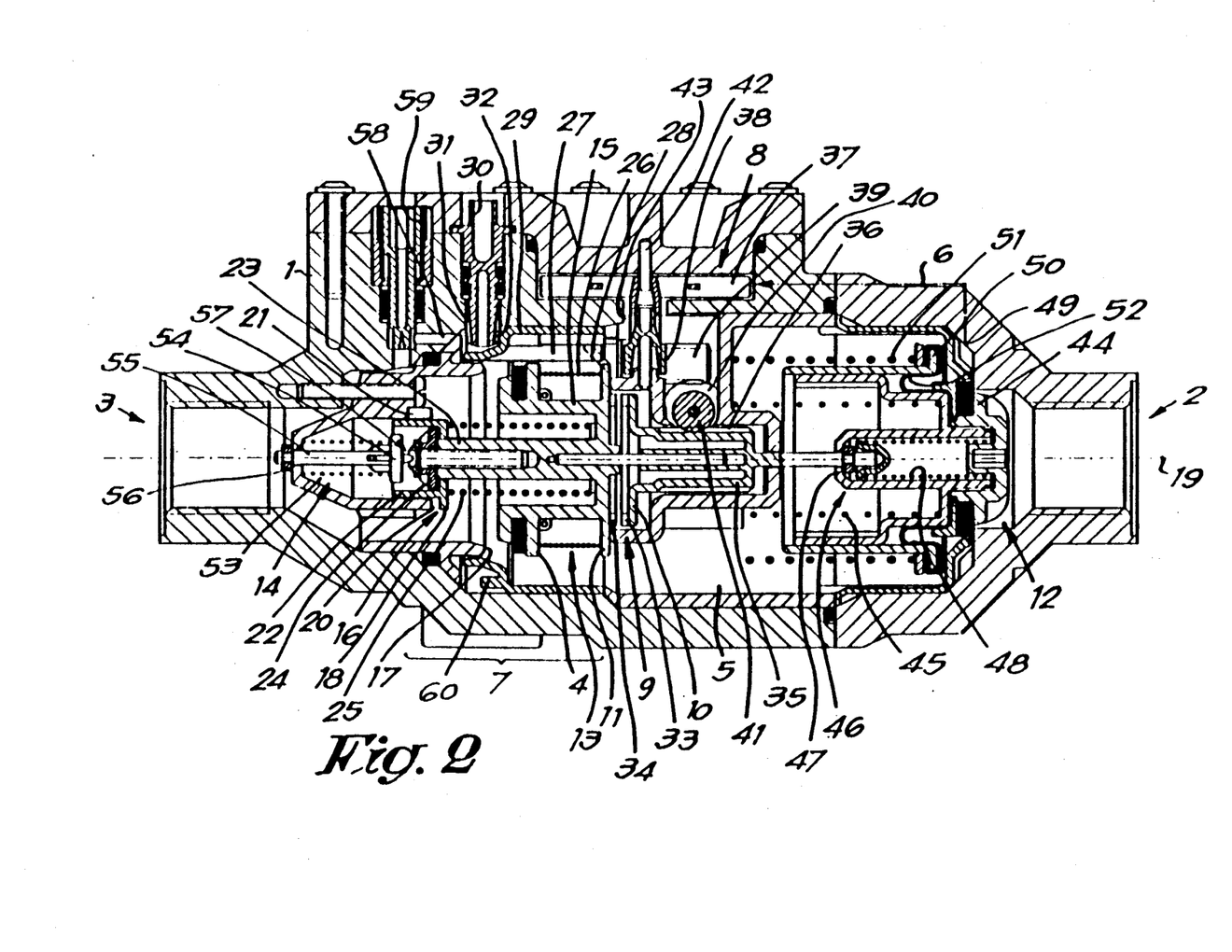
FIG. 2 shows a cross-section according to line II—II in FIG. 1.

As shown in FIG. 1, the safety valve principally consists of a housing 1 provided with an inlet 2 and an outlet 3, whereby the inlet 2 is connected to a supply source, while a distribution network for example is coupled to the outlet 3. The housing 1, as shown in FIG. 2, contains a main cut off valve 4 and means working together with the flow of liquid which shut the main cut off valve 4 with the removal of liquid and after a lapse of time, which are reset in their starting position each time when an equal or almost equal pressure is created in the liquid at the inlet 2 and the outlet 3 of the safety valve and which when the main cut off valve 4 is shut, hold it shut as long as a well defined drop of pressure remains in existence over this main cut off valve 4, whereby these means are driven by means of a by-pass through a channel 6 separate from the main passage 5.

The latter means principally consist of a moving mechanism 7 that after a defined stroke provides for the shutting of the main cut off valve 4; driving means 8 driven by means of the aforementioned by-pass in order to move the moving mechanism 7; coupling means 9 consisting of at least a first coupling part 10 and a second coupling part 11, which provide a coupling that can be engaged and disengaged between the driving means 8 and the moving mechanism 7; servo-means 12 which engage the coupling means 9 during the periods that a flow of liquid is created at the inlet 2 or outlet 3; resetting means 13 which work together with the movement means 7 and reset the latter in a starting position each time when the removal of liquid is stopped when the main cut off valve 4 is still opened; and the resetting means 14 working together with the main cut off valve 4 which can bring the main cut off valve from shut to open position when the drop of pressure over the main cut off valve becomes zero or almost zero.

In the embodiment shown in the figures the moving mechanism 7 principally consists of a rotatable element 15, that, as is still further explained in the description, with the engaging of the coupling means 9 is moved by the driving means 8, as well as a guiding mechanism 16 working together with the main cut off valve 4 and the rotatable element 15 that in a well defined angular position allows the axial movement of the main cut off valve 4 situated in a radial plane, all of which such that this valve is pushed onto its seat 17 by the flow of liquid and whether or not with assistance of electric means as yet further described. The rotatable element 15 principally consists of a cylinder which is connected to the main cut off valve 4 or, as shown in FIG. 2, is produced with this in one piece.

The aforementioned guiding mechanism 16 is composed of at least one support in the form of a lip 18 rotating with the rotatable element 15; a circular guide 20 in the form of a collar or similar on which the lip 18 rests and can slide over, situated in a radial plane in relation to the axial axis 19 of the valve; and at least one axial notch 21 installed in the guide 20, such that with the rotation of the rotatable element 15 and the lip 18 rotating with this, the latter can be brought into a position whereby it is opposite the notch 21, through which the lip 18 engages with the notch 21 and the main cut off valve 4 can be pushed into its seat 17.

The safety valve preferably also shows a flow rupture safety device, in other words a safety device which allows that at any moment with an excessively large removal flow the main cut off valve 4 is automatically shut. For this purpose the aforementioned lip 18 is part of a part 22 axially movable in relation to the rotatable element 15. The part 22 is slidable over for example a hexagonal guide 23 provided on the rotatable element 15, whereby the part 22 in a farthest undepressed position, is pushed against a stop 24 by means of a compression spring 25 installed around the hexagonal guide 23. The precise operation of the unit is further described hereafter.

The resetting means 13 which can reset the moving mechanism into the starting position, principally consist of a torsion spring 26 which forces the rotatable element 15 into a well defined sense of rotation, whereby the movement is limited by means of a stop 27 against which the rotatable element 15 makes contact, for example by means of a lip 28 or any other support provided hereon. The stop 27 is preferably movable. It is clear that because of this the length of the stroke of the lip 18 over the guide 20 can be altered before this lip 18 is placed opposite the notch 21. In order to be able to move the stop 27, in the embodiment shown in the figures it is installed on a rotatable regulating element 29 of which the desired angular position can be adjusted by means of adjusting means 30. The regulating element 29 hereby consists of a cylinder which is situated around the rotatable element 15. The stop 27 is for example formed by a protrusion in the form of a rod present on the inside of the cylinder. The adjusting means 30 are formed by a shaft, rotatable for example by means of a hexagonal key, which has a toothing 31 on its circumference which meshes with a rim gear 32 provided on the circumference of the rotatable regulating element 29, such that through the rotation of the adjusting means 30 the position of the stop 27 can be chosen. It is clear that the adjusting means 30 and/or the rotatable regulating element 29 provide for a sufficiently self restraining operation, such that with the driving of the rotatable element 15 the rotatable regulating element 29 is not taken along by the force of the torsion spring 26. It is observed that the torsion spring is preferably attached by its extremities between on the one hand the rotatable element 15, and on the other hand the rotatable regulating element 29.

Figure 3:
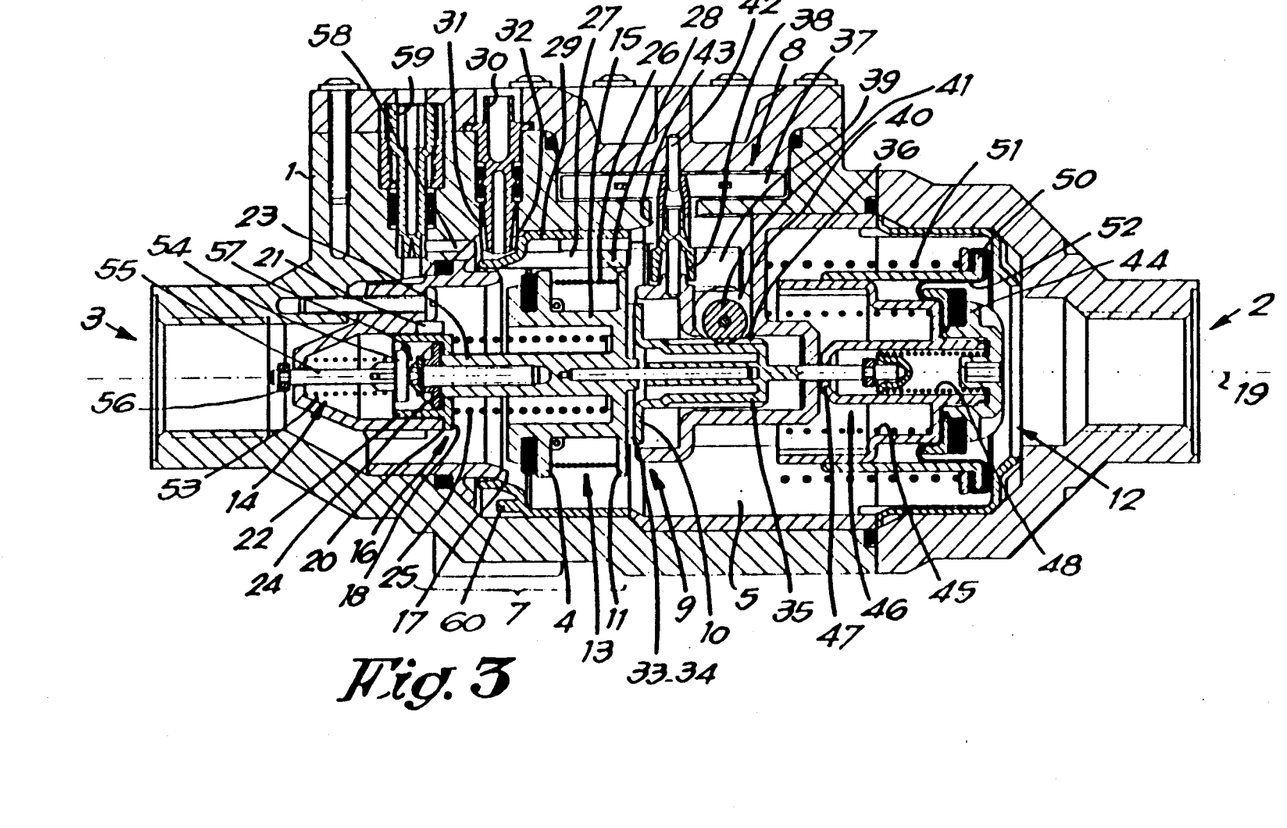
FIGS. 3 and 4 show in a similar view to that from FIG. 2 the safety valve for different positions.

In the embodiment shown both the coupling parts 10 and 11 of the coupling means 9 stand axially disposed in each others prolongation. On their sides directed toward each other they are equipped with toothings in the form of a rim gear, respectively 33 and 34. The first coupling part 10 shows a cylindrical part 35 on which there is a toothing via which the driving of the driving means 8 occurs. The first coupling part 10 can be moved axially toward the second coupling part 11 by means of the servo-means 12, whereby the toothings 33-34 them mesh with each other. The second coupling part 11 is connected to the rotatable element 15 or, as shown in FIG. 2, forms one unit with this. FIG. 3 shows the meshing in the coupled position.

The driving means 8 principally consist of a turbine 37, placed in the aforementioned by-pass, which is coupled via several transmissions, formed by worm and toothed wheels 38 through 41, to the first coupling part 10, more especially to the toothing 36. The first worm wheel 38 is mounted on the shaft 42 of the turbine 37. The worm and toothed wheel transmissions permit very great transmission ratios. Preferably a transmission ratio of at least 1/3.000 is realised, while in a practical embodiment this preferably amounts to 1/30.000, which means that the turbine has to make 30.000 revolutions in order to rotate the coupling part 10 one revolution.

It is clear that the channel 6 exits tangentially in the chamber of the turbine 37. The liquid leaves the turbine along a passage 43 which is around the shaft 42, but can also according to a variant, as with a single jet water meter, flow out on the opposite side of the inlet.

In the embodiment shown the aforementioned servo-means 12 consist of a cut off valve 44 placed in the inlet 2, which by means of a relatively light spring 45 is forced against the direction of flow of the liquid toward its closed position. The cut off valve 44 is connected to the first coupling part 10 by means of a connection 46. The force of the spring 45 is so selected that the cut off valve 44 opens with the slightest difference in pressure and the first coupling part 10 couples with the second coupling part 11.

The connection 46 is telescopically collapsible and shows stop forming means 47, such as a collar, as well as elastic means, such as a compression spring 48, which push the first coupling part 10 and the cut off valve 44 to a maximum position from each other, whereby in this position and when the cut off valve 44 is shut, thus as in FIG. 2, the first coupling part 10 is just not coupled to the second coupling part 11. The telescopic connection 46 permits that, on the one hand, only limited movement of the first coupling part 10 is necessary in order to engage the coupling means 9 and on the other hand, after the engagement of the coupling means 9 the valve 44 can still further open, such by the depression of the spring 48.

The spring 48 also has the function of providing that in depressed position and with putting the lip 18 and the notch 21 opposite each other the main cut off valve 4 can also already be pushed shut by very small flows, such that for the shutting of the main cut off valve 4 no flow of well defined volume is required.

The inlet 49 of the channel 6 is, as is schematically shown in FIG. 2, downstream from the cut off valve 44, but upstream from the main cut off valve 4. This offers the advantage that with the removal of liquid first the coupling means 9 are engaged by means of the cut off valve 44, only after which liquid can flow through the channel 6 and the turbine 37 can be driven.

In FIG. 2 the channel 6 is only schematically denoted. The precise location of this is shown more clearly in FIG. 1.

In order to obtain that already the slightest flow of liquid would provide for the driving of the turbine 37, the safety valve shows a second cut off valve 50 which is placed in the main passage 5, downstream from the seat of the aforementioned cut off valve 44. The cut off valve 50 is forced into the closed position by means of a spring 51 and only opens with a sufficiently great difference in pressure. The inlet 49 of the channel 6 is situated between the respective seats of the two cut off valves 44 and 50, such that with a limited flow of liquid the liquid only flow through the channel 6, while with a greater flow of liquid and a greater difference in pressure the cut off valve 50 opens and the liquid flows both through the main passage 5 and through the channel 6. The cut off valves 44 and 50 perferably each consist of cylindrical bodies which are axially slidable along each other, whereby a mutual sealing is provided in the form of a supple bendable seal 52 or rolling membrane.

The aforementioned resetting means 14 principally consist of a compression spring 33 which can open the main cut off valve 4 when the difference in pressure of the pressures along both sides of the latter is almost zero, but in its farthest position does not necessarily couple the main out off valve 4 and more especially the second coupling part 11, to the first coupling part 10. In order to obtain the latter, the expansion of the compression spring 53 is limited to a well defined length, such by stop forming elements 54, 55 and 56. In order to keep the friction between the resetting means 14 and the rotatable element 15 to a minimum the contact zone 57 between the element 54 and the part 22 is limited to a minimum, almost to a point contact.

The safety valve preferably also shows means which permit a new buildup of pressure. In the embodiment shown according to FIG. 2 these means consist of a connecting channel 58 that connects the spaces before and after the main cut off valve 4, as well as means installed herein in order to regulate the passage, for example an adjusting screw 59 which by screwing in, respectively screwing out shuts off the connecting channel to a greater or lesser degree.

Figures 4, 5, 6:
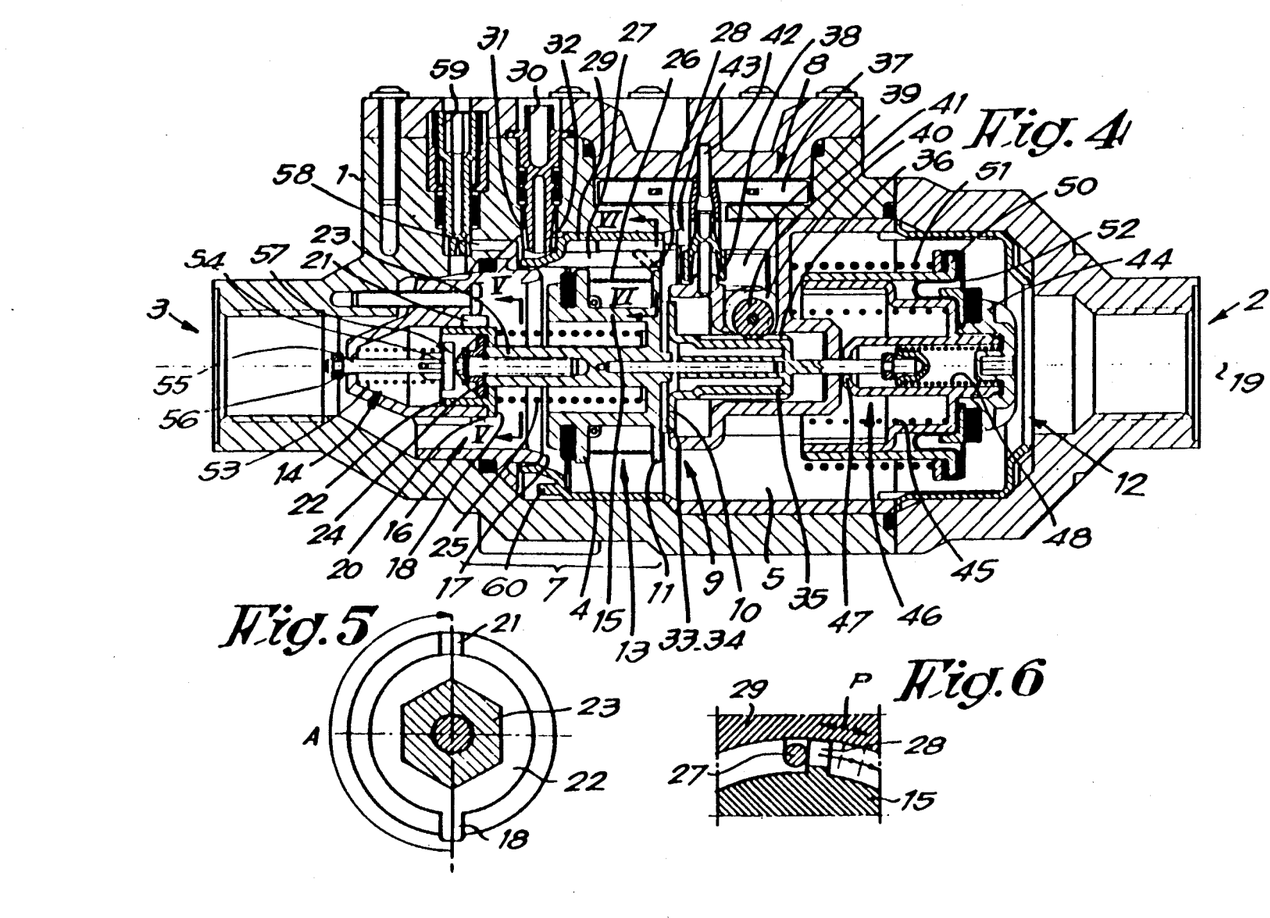
FIGS. 5 and 6 show on larger scale cross-sections according to lines V—V and VI—VI in FIG. 4.

The operation of the safety valve can be deducted from the FIGS. 2 through 9 and is as described hereafter. FIG. 2 shows the safety valve in condition of rest. With the removal of water from the network of pipes connected to the outlet 3 the pressure at the outlet 3 and thus also behind the cut off valve 44 becomes less than at the inlet 2. Because of this, as shown in FIG. 3, the cut off valve 44, which functions as switch valve, is moved, through which the first coupling part 10 meshes with the second coupling part 11. From that moment the liquid can already flow via the channel 6 through the turbine 37 through which this begins to rotate. When sufficient liquid is requested at the outlet 3 and consequently a sufficiently large drop in pressure is present before and after the cut off valve 50, the latter is also opened, so that a condition arises, as shown in FIG. 4. At that moment a normal through flow is realised whereby the liquid flows from the inlet 2 via the main passage 5 toward the outlet 3 and whereby a small part of the liquid keeps flowing through the channel 6 with almost a constant flow, since by opening the cut off valve 50, the drop in pressure over the inlet and outlet of the channel 6 is maintained almost constant.

The driven turbine then ensures that the first coupling part 10 is rotated around its axis via the worm and toothed wheels 38 through 41, that in its turn takes along in its rotating movement the second coupling part 11 and the rotatable element 15. The rotatable element 15 is then rotated against the force of the torsion spring 26, whereby the part 22 with the lip 18 slides over the guide 20. The lip 28 hereby comes loose from the stop 27.

In the FIGS. 2 through 4 a starting position is shown whereby as further clarified in FIG. 5 the part 22 must follow an angle A of 180 degrees before the lip 18 is placed opposite the notch 21. In FIG. 6 it is shown in detail how the lip 28 of the rotatable element 15 makes contact in the starting position with the stop 27 of the regulating element 29 adjustable according to arrow P.

Figures 7, 8, 9:
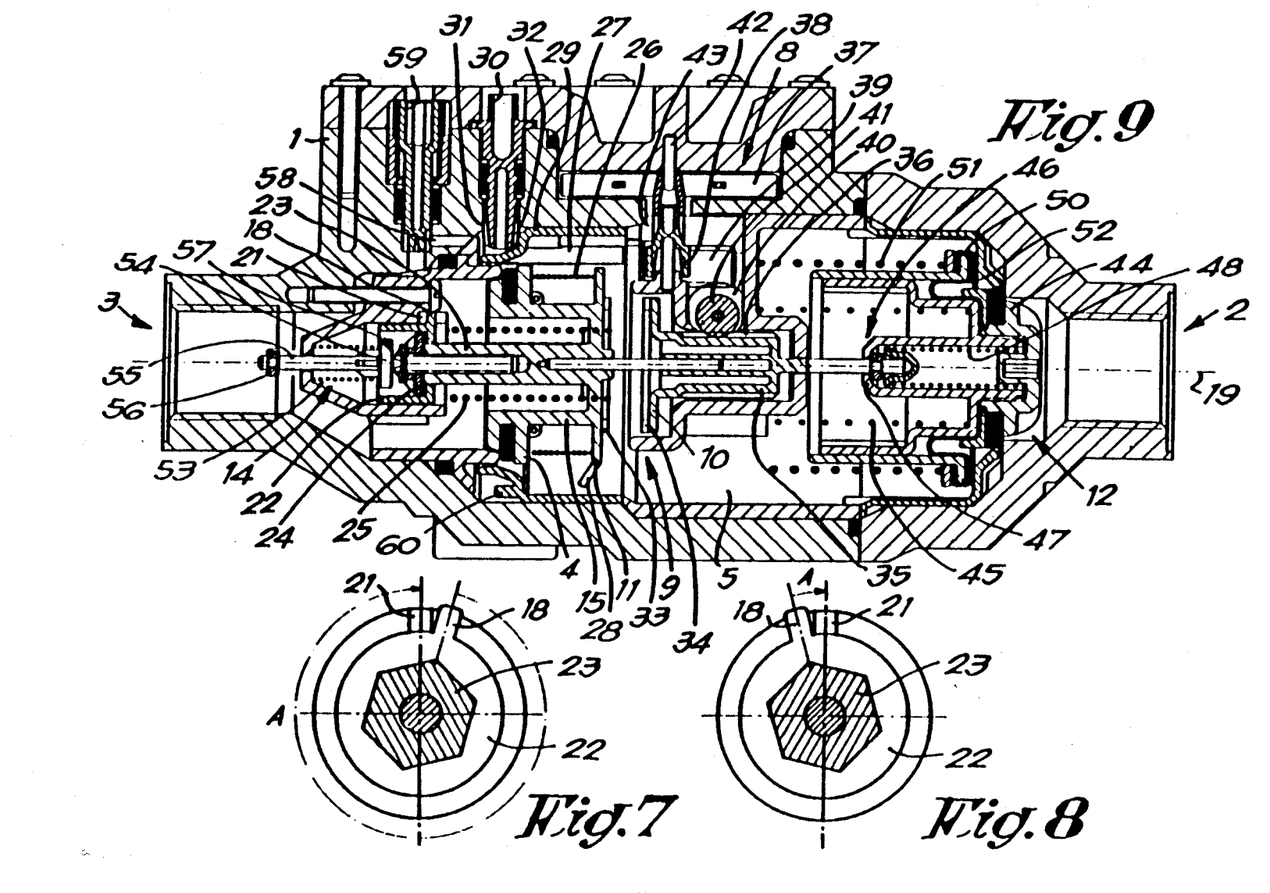
FIGS. 7 and 8 show different positions of the part that is shown in FIG. 5.
FIG. 9 shows the safety valve in a similar view to that from FIG. 2, such for yet another position.

It is clear that by the movement of the rotatable regulating element 29, such by means of the adjusting means 30, the stop 27 can be situated in different positions, through which the lip 18 can then also take on a different starting position in relation to the notch 21. In FIG. 7 a starting position is shown whereby the rotatable element 15 and the part 22 connected herewith as well as the lip 18 must first follow an angle A of almost 360 degrees before the lip 18 is brought opposite the notch 21. FIG. 8 shows another adjustment whereby the angle A amounts to a minimum. The minimum and maximum adjustment is determined by a stop 60 which is included in the rim gear 32 and with the minimum or maximum position, either along one side or along the other side comes into contact with the rotatable shaft 30.

When for a well defined period an uninterrupted flow of liquid remains in existence, after a defined time the lip 18 is placed opposite the notch 21, with the result that the main cut off valve 4 can move axially and be closed either by the action of the flow of liquid, or under the influence of the spring 48 in the case of small through flows when the drop in pressure over the cut off valve 4 thus contributes little or nothing to the movement of the main cut off valve 4 against the force of the spring 53. The lip 18 hereby enters into the notch 21. This position is shown in FIG. 9. The connection via the coupling parts 10 and 11 remains in existence under the influence of the force exerted by the spring 48 against the force of the spring 53, until the last moment that there is through flow of liquid. Immediately after the shutting of the main cut off valve 4 the pressures before and after the cut off valve 44 and 50 become equal, through which these valves are closed by means of their springs. As a result of this the first coupling part 10 is uncoupled from the second coupling part 11 via the connection 46 and with the help of the stop forming means 47.

In order to open the main cut off valve 4 again, a buildup of pressure must again be realised at the outlet 3 which is equal or almost equal to the pressure in the liquid at the inlet 2, such that the resetting means 14 can again bring the main cut off valve 4 into opened position. This buildup of pressure is realised because a very limited amount of water can come via the connecting channel 58 from before the main cut off valve 4 to after the main cut off valve, whereby it is then required that the network of pipes or similar connected to the outlet 3 is again closed. In that case this network of pipes is partially filled until the buildup of pressure is realised whereby the main cut off valve 4 is opened.

In the case that the network of pipes connected to the outlet 3 is already sealed off before the lip 18 has reached the notch 21, the moving mechanism 7 is replaced in the starting position, such because in that case due to the equal pressure before and after the cut off valves 44 and 50 the latter are closed, through which the first coupling part 10 is pulled loose from the second coupling part 11 and the rotatable element 15 is rotated back by means of the torsion spring 26 such until the lip 28 rests against the stop 27.

The use of a separate channel 6 for driving has as advantage that a relatively small and very precise regulating and measuring element, such as the turbine 37, can be applied with a high starting sensitivity, so that very limited consumptions of liquid can also be measured. Furthermore the power will be almost independent of the size of the total flow that flows through the safety valve, since—as already clarified earlier—the through flow through the channel 6 and through the turbine 37 is maintained almost constant. In so doing it is obtained that the movement of the lip 18 is principally proportional to the period of time during which a flow of liquid, irrespective whether large or small, remains in existence through the safety valve 1. By the regulation of the adjusting means 30, and the shifting of the stop 27 between the minimum and maximum position, in practise a regulation is then also possible between a period of approximately one hour, maximum, to two minutes, minimum.

The safety valve according to the invention offers the advantage that with the protracted opening of a tap, connected to the outlet 3, the main cut off valve 4 shuts, but can easily be opened again by closing the tap again for a while until a new buildup is realised at the outlet. In the case of a burst pipe or similar the safety valve forms a safety device, which effects an automatic shut off, with exception of the possible very minimal flow of liquid through the connecting channel 58.

When a pipe rupture or similar occurs before the outlet 3, the drop of pressure over the main cut off valve 4 becomes so great that this is closed against the force of the compression spring 25 irrespective of the position of the part 22.

From the figures it is clear that, in order that the safety valve may function well, the spring 51 is so selected that the cut off valve 50 remains shut until a drop in pressure is created which is sufficiently great to engage the coupling means 9 and to deliver a force which allows the main cut off valve to close against the force of its resetting means 14. Furthermore the elastic means 48 must deliver a greater tension than the resetting means 14 of the main cut off valve 4.

It is clear that the safety valve can also function as limiter in order to prevent that for a predetermined time specific amounts of water are taken, whereby the adjusting screw 59 can be screwed in completely so that the connecting channel 58 is closed, and this adjusting screw is sealed, such that the main cut off valve 4 can only be opened again by an authorised person.

The present invention is in no way restricted to the embodiments described as examples and shown in the figures, but such safety valve can be implemented in all kinds of forms and dimensions without departing from the scope of the present invention.

I claim:

1. A safety valve, comprising:
   a housing having an inlet, an outlet, a main passage, and a bypass channel;
   a main cut-off valve installed in the housing;
   means, actuated by the flow of liquid within the safety valve, for moving the main cut-off valve into a closed position after a predetermined period of time has lapsed and for holding the main cut-off valve in the closed position when a pressure drop exists across the main cut off valve, the moving and holding means being reset to a starting position each time a first pressure on liquid at the inlet and a second pressure on liquid at the outlet are approximately equal and including
   a moving mechanism which after moving a specific stroke distance closes the main cut-off valve,
   driving means, disposed in the bypass channel, for driving the moving mechanism
   first resetting means for moving the moving mechanism into the starting position each time the main cut off valve is in an open position and liquid is not being removed from the safety valve;
   second resetting means for moving the main cut-off valve from the closed position to the open position when the pressure drop across the main cut off valve is approximately zero;
   a second cut-off valve disposed in the main passage which ensures that a substantially constant drop of pressure is created across the bypass channel;
   a coupler having first and second coupling parts which can be engaged and disengaged with each other, the coupler being connected to the driving means and the moving mechanism; and
   a servo device which engages with the coupler when a flow of liquid is created at the inlet such that when the first and second coupling parts are not engaged the first resetting means are set into operation.

2. A safety valve according to claim 1, further comprising means for allowing a new buildup of pressure behind the main cut-off valve after the main cut-off valve is in the closed position.

3. A safety valve according to claim 2, wherein the means for allowing the new buildup of pressure includes a connecting channel that connects a first space located before the main cut-off valve with a second space located after the main cut-off valve.

4. A safety valve according to claim 3, wherein the connecting channel includes means for regulating the flow of liquid therethrough.

5. A safety valve according to claim 4, wherein the means for regulating the flow includes an adjusting screw which can be screwed to regulate the flow of liquid through the connecting channel.

6. A safety valve according to claim 1, wherein the moving mechanism includes a rotatable element that engages with the coupler and is moved by the driving means, and a guiding mechanism cooperating with the main cut-off valve and the rotatable element such that when the guiding mechanism is moved over a defined angular distance, the main cut-off valve can move from the open position to the closed position.

7. A safety valve according to claim 6, wherein the rotatable element is connected to the main cut-off valve or is integrally produced with the main cut-off valve as a single piece.

8. A safety valve according to claim 6, wherein the guiding mechanism includes a lip which rotates with the rotatable element and a circular guide on which the lip rests and slides over, and wherein the circular guide has an axial notch such that when the lip enters the axial notch, the main cut-off valve is in the closed position.

9. A safety valve according to claim 6, further comprising a stop which determines the starting position of the rotatable element.

10. A safety valve according to claim 9, wherein the stop is movable, and further comprising means for adjusting a position of the stop.

11. A safety valve according to claim 10, further comprising a regulating element which is rotatable around the rotatable element, the regulating element including the stop.

12. A safety valve according to claim 11, wherein the regulating element further includes a rim gear and the adjusting means includes a rotatable shaft having teething thereon, the teething meshing with the rim gear.

13. A safety valve according to claim 6, wherein the first resetting means includes a torsion spring.

14. A safety valve according to claim 1, wherein the first and second coupling parts have first and second teething, respectively, the first and second teething meshing with each other.

15. A safety valve according to claim 6, wherein the first and second coupling parts have first and second teething, respectively, and the first and second teething can mesh with each other, and wherein the first coupling part is driven in a rotating manner by the driving means and the second coupling part is an integral part of or is connected to the rotatable element.

16. A safety valve according to claim 15, wherein the first and second coupling parts are rotatable along a common axis, and the first coupling part is movable along the common axis by the servo device, such that the first coupling part engages with the second coupling part.

17. A safety valve according to claim 15, wherein the driving means includes a turbine which is disposed in the bypass and which is coupled to the first coupling part.

18. A safety valve according to claim 17, wherein the first coupling part and the turbine are connected to each other via a plurality of worm and toothed wheel transmissions.

19. A safety valve according to claim 18, wherein the plurality of worm and toothed wheel transmissions create an overall transmission ratio of at least 1/3.000.

20. A safety valve according to claim 19, wherein the servo device includes an axially movable cut-off valve disposed in the inlet, and wherein the axially movable cut-off valve, when in an open position couples the first coupling part to the second coupling part, and the axially movable cut-off valve is forced into its closed position by means of a spring and is in its open position when a predetermined small pressure difference exists across the axially movable cut-off valve.

21. A safety valve according to claim 20, wherein the first coupling part and the axially movable cut off valve are axially disposed in relation to each other and are connected to each other by a telescopically collapsible connection, the collapsible connection having a stop and an elastic part which push apart the first coupling part and the axially movable cut-off valve into a maximum extended position such that in a position of rest the first coupling part is located in front of and does not engage with the second coupling part, and wherein when the first and second coupling parts engage each other, the axially movable cut off valve can still open against the force of the elastic part.

22. A safety valve according to claim 21, wherein the bypass channel has an inlet which faces toward the turbine and which is located downstream from a seat of the axially movable cut-off valve and upstream from a seat of the main cut-off valve.

23. A safety valve according to claim 20, wherein the second cut-off valve is disposed in the main passage downstream from the axially movable cut-off valve and is held in a closed position by a spring, and wherein when liquid is removed from the safety valve the second cut-off valve is opened by the pressure of liquid, and the inlet of the bypass channel begins in a space which is situated between the seat of the axially movable cut-off valve and the seat of the second cut-off valve.

24. A safety valve according to claim 23, wherein the spring keeps the second cut off valve in its closed position until a predetermined drop in pressure is created which causes the first and second coupling parts to engage and which delivers a first force that allows the main cut-off valve to move to its closed position against a second force of the second resetting means.

25. A safety valve according to claim 22, wherein the elastic part creates a first force which is greater than a second force created by the second resetting means.

26. A safety valve according to claim 23, wherein the axially movable and second cut-off valves are mounted concentrically, and further comprising a supple, pliable seal which is disposed between the axially movable cut-off valve and the second valve cut-off valve.

27. A safety valve according to claim 26, wherein the second resetting means includes a spring which exerts a comprehensive force on the main cut-off valve, in a direction opposite to a direction of the flow of liquid.

28. A safety valve according to claim 1, further comprising a flow rupture safety device disposed between the main cut-off valve and the guiding mechanism.

29. A safety valve according to claim 6, wherein the safety valve further comprise a flow rupture safety device including a coupling disposed between the main cut-off valve and the guiding mechansim, the coupling allowing a movement of the main cut-off valve up to its seat, and a flow rupture spring mounted in the coupling which only allows the movement of the main cut-off valve with respect to the guiding mechanism when a predetermined high difference in pressure over the main cut-off valve exists.

* * * * *